United States Patent
Kim et al.

(10) Patent No.: US 10,911,669 B2
(45) Date of Patent: Feb. 2, 2021

(54) LIGHT FIELD IMAGING SYSTEM

(71) Applicant: KYUNGPOOK NATIONAL UNIVERSITY INDUSTRY-ACADEMIC COOPERATION FOUNDATION, Daegu (KR)

(72) Inventors: Hak-Rin Kim, Daegu (KR); Min-Kyu Park, Daegu (KR); Tae-Hyun Lee, Daegu (KR)

(73) Assignee: KYUNGPOOK NATIONAL UNIVERSITY INDUSTRY-ACADEMIC COOPERATION FOUNDATION, Daegu (KR)

( * ) Notice: Subject to any disclaimer, the term of this patent is extended or adjusted under 35 U.S.C. 154(b) by 0 days.

(21) Appl. No.: 16/678,851

(22) Filed: Nov. 8, 2019

(65) Prior Publication Data
US 2020/0154042 A1    May 14, 2020

(30) Foreign Application Priority Data
Nov. 9, 2018  (KR) .................. 10-2018-0137369

(51) Int. Cl.
*H04N 5/232* (2006.01)
*G02F 1/01* (2006.01)
(Continued)

(52) U.S. Cl.
CPC ....... *H04N 5/23232* (2013.01); *G02F 1/0136* (2013.01); *G02F 1/133526* (2013.01);
(Continued)

(58) Field of Classification Search
CPC ............ G02F 1/0136; G02F 1/133526; H04N 5/2253; H04N 5/22541; H04N 5/23232; G06T 3/4007; G06T 3/4023; G06T 3/4053
See application file for complete search history.

(56) References Cited

U.S. PATENT DOCUMENTS

2003/0002131 A1* 1/2003 Zou .......................... G02F 1/21
                                                      359/291
2010/0066812 A1* 3/2010 Kajihara ................ H04N 5/232
                                                      348/46
(Continued)

FOREIGN PATENT DOCUMENTS

JP    11168744 A    6/1999
JP    2010032759 A  2/2010
(Continued)

OTHER PUBLICATIONS

Park, Heewon, "Resolution-Enhanced Light-Field Camera Using Polarization-Dependent Microlens Array" Disclosure in the thesis for the Degree of Master of Science on Feb. 1, 2018 (66 pages).
(Continued)

*Primary Examiner* — Chiawei Chen
(74) *Attorney, Agent, or Firm* — Procopio, Cory, Hargreaves & Savitch LLP

(57) ABSTRACT

A light field imaging system includes a lens configured to collect light transmitted from an object; a polarizer configured to polarize the light; a polarization switching unit configured to repeatedly switch the polarization direction of the light in first and second polarization directions; first and second polarization dependent lens arrays configured to operate as a lens when the polarization direction of the light is the first and second polarization direction, respectively, and having a staggered arrangement; an image sensor configured to obtain a first image from the light collected by the
(Continued)

first polarization dependent lens array and obtain a second image from the light collected by the second polarization dependent lens array; and an image processing unit configured to combine the first image and the second image to generate a high resolution image having higher resolution than the first image and the second image.

13 Claims, 20 Drawing Sheets

(51) Int. Cl.
G02F 1/1335 (2006.01)
G06T 3/40 (2006.01)
H04N 5/225 (2006.01)
(52) U.S. Cl.
CPC .......... *G06T 3/4007* (2013.01); *G06T 3/4053* (2013.01); *H04N 5/2253* (2013.01); *H04N 5/22541* (2018.08)

(56) References Cited

U.S. PATENT DOCUMENTS

| | | | | |
|---|---|---|---|---|
| 2012/0268812 | A1* | 10/2012 | Anhut | G02F 1/0136 |
| | | | | 359/386 |
| 2013/0208082 | A1* | 8/2013 | Williams | H04N 5/22541 |
| | | | | 348/36 |
| 2015/0146082 | A1* | 5/2015 | Kim | H04N 5/22541 |
| | | | | 348/360 |
| 2015/0331247 | A1* | 11/2015 | Srivastava | G02F 1/13306 |
| | | | | 349/15 |
| 2017/0248796 | A1* | 8/2017 | Banks | G01S 17/894 |
| 2018/0239177 | A1* | 8/2018 | Oh | G02F 1/13718 |
| 2018/0284417 | A1* | 10/2018 | Deisseroth | H04N 5/2625 |
| 2019/0235300 | A1* | 8/2019 | Sharp | H04N 9/04521 |

FOREIGN PATENT DOCUMENTS

| | | |
|---|---|---|
| JP | 2014182299 A | 9/2014 |
| KR | 1020050093877 A | 9/2005 |
| KR | 10-2009-0094266 A | 9/2009 |
| KR | 1020140061234 A | 5/2014 |
| KR | 10-2017-0004704 A | 1/2017 |

OTHER PUBLICATIONS

"Light field imaging system utilizing switchable micro-lens array" The 25th Conference on Optoelectronics and Optical Communications; Disclosure at a conference on May 30, 2018 (3 pages).

Lee, T-H. et al. "Switchable micro-lens array for resolution and DOF enhanced light-field imaging system" 27th International Liquid Crystal Conference; Disclosure at a conference on Jul. 22, 2018 (9 pages).

2018 Optics and Photonics Congress, Disclosure at a society meeting on Aug. 27, 2018 (2 pages).

Lee, T-H. et al. "Light field imaging system utilizing switchable micro-lens array to improve depth of field and resolution of reconstructed image" The 18th International Meeting on Information Display; Disclosure at a conference on Aug. 28, 2018 (3 pages).

* cited by examiner

LIGHT FIELD IMAGING SYSTEM

CROSS-REFERENCE TO RELATED APPLICATIONS

This U.S. non-provisional patent application claims priority under 35 U.S.C. § 119 of Korean Patent Application No. 10-2018-0137369, filed on Nov. 9, 2018, the entire contents of which are hereby incorporated by reference.

STATEMENT REGARDING PRIOR DISCLOSURES BY THE INVENTORS

The inventors of the present application authored and disclosed the subject matter of the present application on Feb. 1, 2018 (disclosure in the thesis for the Degree of Master of Science), May 30, 2018 (disclosure at a conference), Jul. 22, 2018 (disclosure at a conference), Aug. 27, 2018 (disclosure at a society meeting) and Aug. 28, 2018 (disclosure at a conference). These prior disclosures have been submitted in an Information Disclosure Statement in the present application as ""Light field imaging system utilizing switchable micro-lens array" The 25th Conference on Optoelectronics and Optical Communications; Disclosure at a conference on May 30, 2018 (3 pages)"; "LEE, T-H. et al." Switchable micro-lens array for resolution and DOF enhanced light-field imaging system" 27th International Liquid Crystal Conference; Disclosure at a conference on Jul. 22, 2018 (9 pages)"; "2018 Optics and Photonics Congress, Disclosure at a society meeting on Aug. 27, 2018 (2 pages)" and "LEE, T-H. et al. "Light field imaging system utilizing switchable micro-lens array to improve depth of field and resolution of reconstructed image" The 18th International Meeting on Information Display; Disclosure at a conference on Aug. 28, 2018 (3 pages)", respectively.

BACKGROUND

The present disclosure herein relates to a light field imaging system, and more particularly, to a light field imaging system capable of increasing a lateral resolution of a recovered image without degrading an angular resolution.

Light field imaging technique, as a technique for imaging an object by placing a microlens array on a charge coupled device (CCD) array, is a technique that may record not only the intensity information of the light reflected from an object but also the angular information and may obtain three-dimensional information on the object based on the information.

FIGS. 1 and 2 are views showing a conventional light field imaging system. The light field imaging system includes an objective lens for collecting light reflected from an object, a microlens array for selectively transmitting light according to the direction of the light collected by the lens, and an image sensor for imaging light transmitted through the microlens array. The resolution in the light field imaging system is equal to the period of the microlens array, and objects that exist at intervals smaller than the period of the microlens array (e.g., a triangular object in FIG. 1) cannot be imaged.

The light field imaging system records the intensity information of light reflected from an object on a CCD array and performs imaging thereof. Through processing the image obtained by the CCD array, the light field imaging system may recover directional-view images according to the direction of viewing an object, such as front/left/right/up/down, and refocused images focused at an arbitrary depth point.

However, the lateral resolution of the image recovered by the conventional light field imaging system is reduced in proportion to the angular resolution, which is the number of directions of the directional-view image. In order to improve the resolution in a light field imaging system, as shown in FIG. 2, the period of the microlens array may be reduced. However, when the same CCD array is used, the number of pixels of the CCD array covered by each microlens of the microlens array is reduced. This means that the number of vector information obtained by reflection at one point is reduced and the number of directions and angular resolution of the directional-view image are reduced.

For example, in a case of a light field imaging system designed to recover 4-way directional-view images, the lateral resolution of the recovered image is reduced to one quarter of the 2D image lateral resolution. In another example, in a case of a light field imaging system in which the number of directions of a directional-view image is designed to be 100 in order to increase angular resolution, the lateral resolution of the recovered image is reduced to $1/100$ of the 2D image lateral resolution. That is, the angular resolution of the light field imaging system and the resolution of the recovered image have a trade-off relationship.

If the arrangement period of the microlens array is reduced by half in both horizontal and vertical directions, the resolution of the light field imaging system and the lateral resolution of the recovered image are increased, but the number of directions and angular resolution are reduced to one quarter. Accordingly, there is a need for a technique for improving the resolution of a light field imaging system having a relatively low resolution as compared to a high resolution 2D imaging system.

SUMMARY

The present disclosure provides a light field imaging system capable of increasing a lateral resolution of a recovered image without degrading angular resolution.

An embodiment of the inventive concept provides a light field imaging system including: a lens configured to collect light transmitted from an object; a polarizer disposed at the rear of the lens on the basis of a propagation direction of the light and configured to polarize the light collected by the lens; a polarization switching unit disposed at the rear of the polarizer on the basis of the propagation direction of the light and configured to repeatedly switch the polarization direction of the light in a first polarization direction and a second polarization direction; a first polarization dependent lens array disposed at the rear of the polarization switching unit on the basis of the propagation direction of the light and configured to operate as a lens when the polarization direction of the light is the first polarization direction; a second polarization dependent lens array disposed at the rear of the first polarization dependent lens array on the basis of the propagation direction of the light and configured to operate as a lens when the polarization direction of the light is the second polarization direction and has a staggered arrangement with respect to the first polarization dependent lens array; an image sensor disposed at the rear of the second polarization dependent lens array on the basis of the propagation direction of the light and configured to obtain a first image from the light collected by the first polarization dependent lens array and obtain a second image from the light collected by the second polarization dependent lens array; and an image processing unit configured to combine the first image and the second image to generate a high resolution image having higher resolution than the first image and the second image.

In an embodiment, the polarization switching unit may include: a liquid crystal layer; and a polarization control unit configured to alternately operate the first polarization dependent lens array and the second polarization dependent lens array as a lens by switching an electric field applied to the liquid crystal layer to periodically change a liquid crystal array direction of the liquid crystal layer.

In an embodiment, the first polarization dependent lens array may include first microlenses arranged periodically, and the second polarization dependent lens array may include second microlenses arranged periodically at the same period of the first microlenses. The first polarization dependent lens array may be disposed in the staggered arrangement with respect to the second polarization dependent lens array by the half period of the first microlenses.

In an embodiment, the light field imaging system may further include an optical path length control unit disposed between the second polarization dependent lens array and the image sensor and configured to be driven electrically to control an optical path length of the light.

In an embodiment, the optical path length control unit may control the optical path length to allow focal-planes of the first polarization dependent lens array and the second polarization dependent lens array to be matched and image-plane positions of the first polarization dependent lens array and the second polarization dependent lens array to be matched.

In an embodiment, the optical path length control unit may be driven at the same period as the change period of the polarization switching unit.

In an embodiment, the optical path length control unit may be driven only while the first polarization dependent lens array operates as a lens, or may be driven only while the second polarization dependent lens array operates as a lens.

In an embodiment, the second polarization direction may be a direction orthogonal to the first polarization direction.

In an embodiment, the first polarization dependent lens array may include a first liquid crystal lens array, wherein the second polarization dependent lens array may include a second liquid crystal lens array, wherein the liquid crystal array directions of the first liquid crystal phase lens array and the second liquid crystal phase lens array may be perpendicular to each other.

In an embodiment, the liquid crystal array direction of the first liquid crystal lens array may be perpendicular to the first polarization direction or the second polarization direction.

In an embodiment, the image processing unit may generate the high resolution image by interpolating corresponding pixels of the first image and the second image.

In an embodiment, the image processing unit may be configured to: space adjacent first pixels of the first image by a unit pixel, space adjacent second pixels of the second image by the unit pixel, and diagonally move the second pixels by the unit pixel to arrange the second pixels in a grid form intersecting the first pixels; and in an image in which the first pixels and the second pixels are arranged in the grid form, interpolate each of image pixels between the first pixels and between the second pixels with an average value of the first pixels and the second pixels adjacent to each image pixel to generate the high resolution image.

In an embodiment, the image processing unit may be configured to generate the high resolution image by arranging the image pixels calculated by interpolating the first pixels and the second pixels at an interval of the unit pixel.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Figure 1:
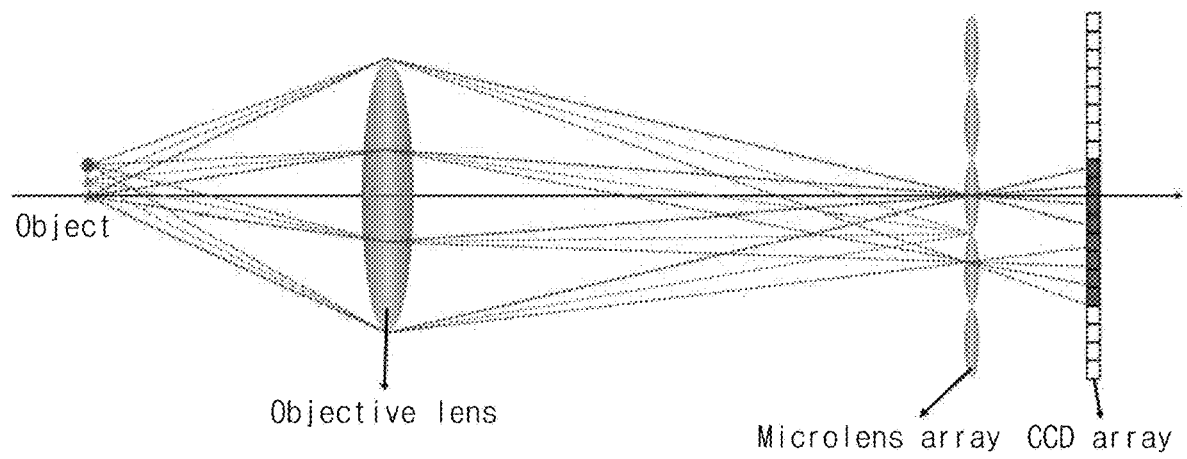
FIGS. 1 and 2 are views showing a conventional light field imaging system.
Figure 2:
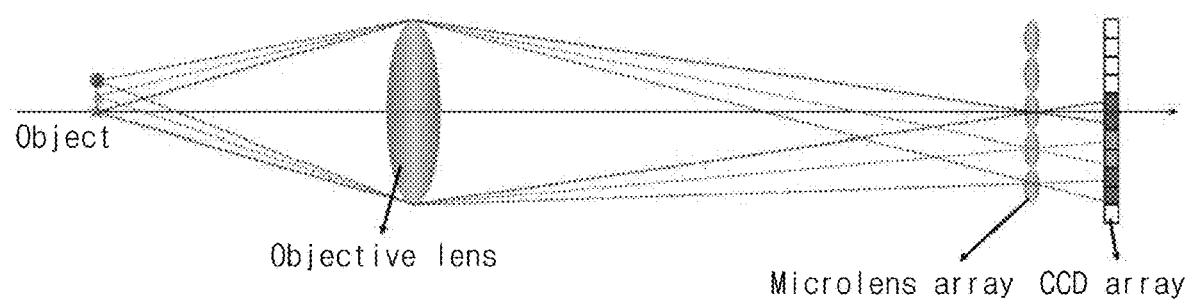

Other advantages and features of the inventive concept, and implementation methods thereof will be clarified through following embodiments described with reference to the accompanying drawings. However, the inventive concept is not limited to embodiments disclosed below and is only defined by the appended claims. Although not defined, all the terms used herein (including technical or scientific terms) have the same meaning as those accepted by common techniques in the conventional techniques that this inventive concept belongs. General descriptions of known configurations may be omitted in order not to obscure the subject matter of the inventive concept. The same reference numerals are used as much as possible with respect to the same or corresponding configuration in the drawings of the inventive concept. In order to help the understanding of the inventive concept, some of the components may be somewhat exaggerated or reduced in the drawings.

Terms used in this specification are used to describe specific embodiments, and are not intended to limit the scope of the inventive concept. The singular expressions include plural expressions unless the context clearly dictates otherwise. Additionally, in various embodiments of the inventive concept, the term "include," "comprise," "including," or "comprising," specifies a property, a region, a fixed number, a step, a process, an element and/or a component but does not exclude other properties, regions, fixed numbers, steps, processes, elements and/or components.

By a virtual-moving microlens array that may be electrically fast switched, the inventive concept provides a light field imaging system that may increase the lateral resolution of a recovered image and the resolution of the system without reducing angular resolution.

Figure 3:
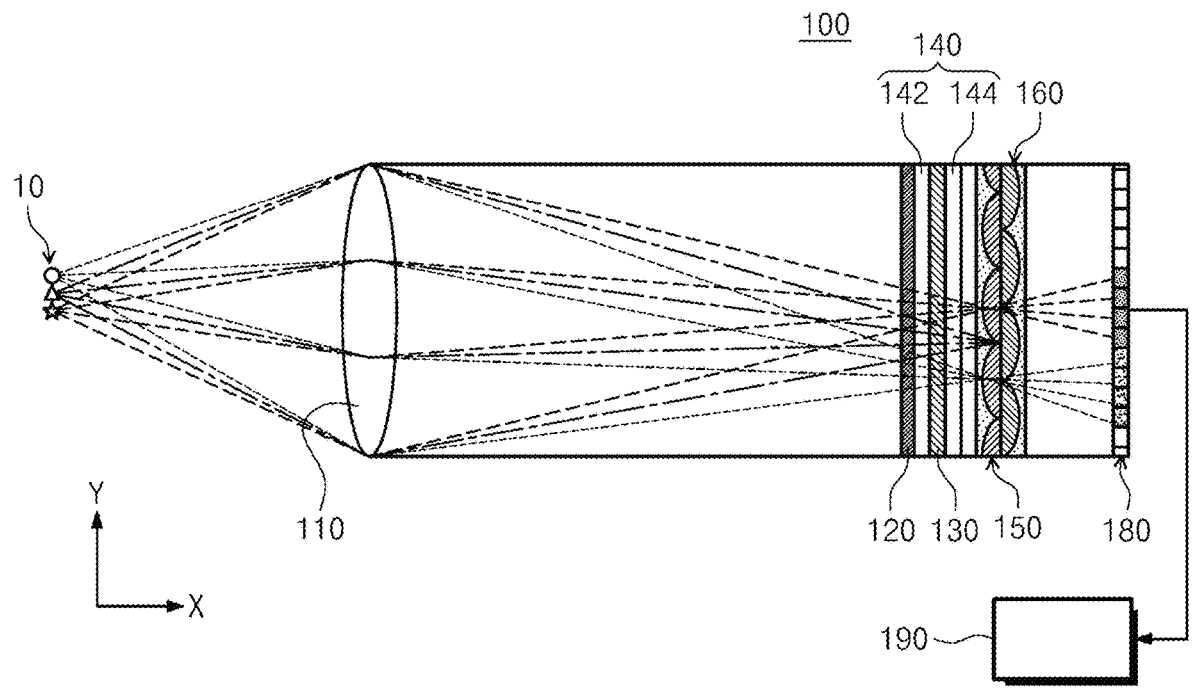
FIGS. 3 and 4 are cross-sectional views showing a light field imaging system according to an embodiment of the inventive concept.
Figure 4:
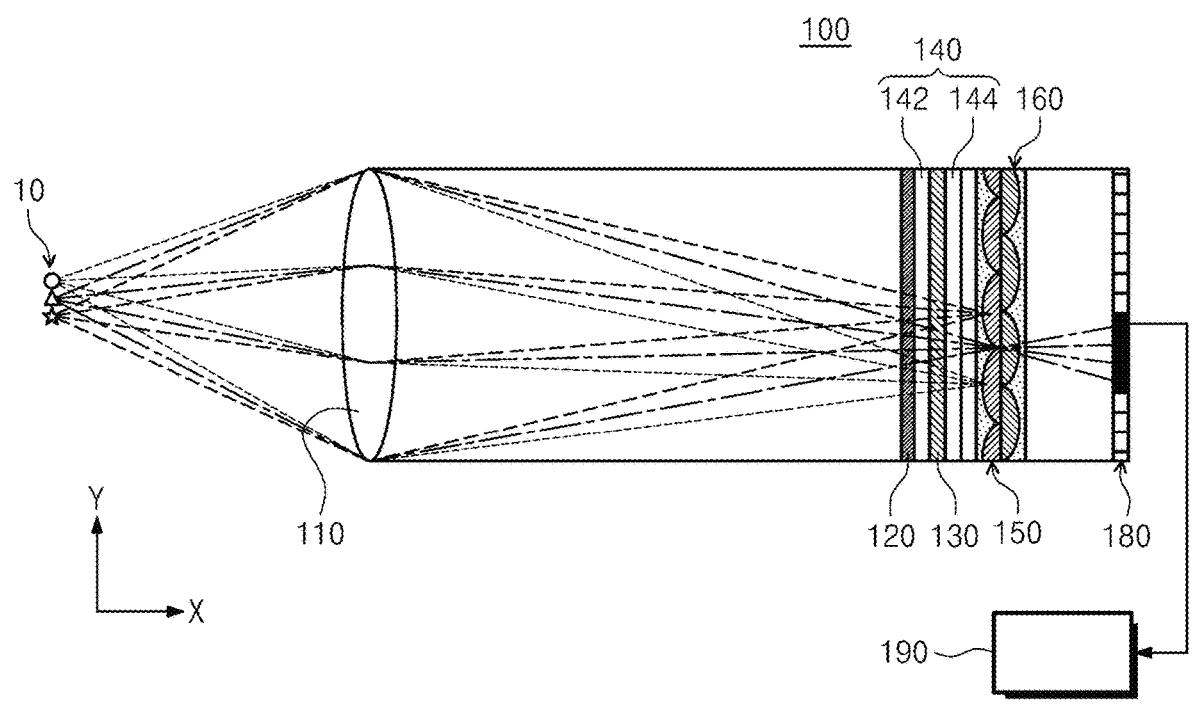

FIGS. 3 and 4 are cross-sectional views showing a light field imaging system according to an embodiment of the inventive concept. Referring to FIGS. 3 and 4, a light field imaging system 100 according to an embodiment of the inventive concept may include a lens 110, a polarizer 120, a polarization switching unit 130, a polarization control unit 140, a first and a polarization dependent lens array 150, a second polarization dependent lens array 160, an image sensor 180, and an image processing unit 190.

The objective lens 110 collects light transmitted from the object 10. The lens 110 receives light reflected from the object 10 to form an image of the object. Light collected by the lens 110 is delivered to a virtual-moving microlens array including the polarizer 120, the polarization switching unit 130, the polarization control unit 140, the first polarization dependent lens array 150, and the second polarization dependent lens array 160.

Figure 5:
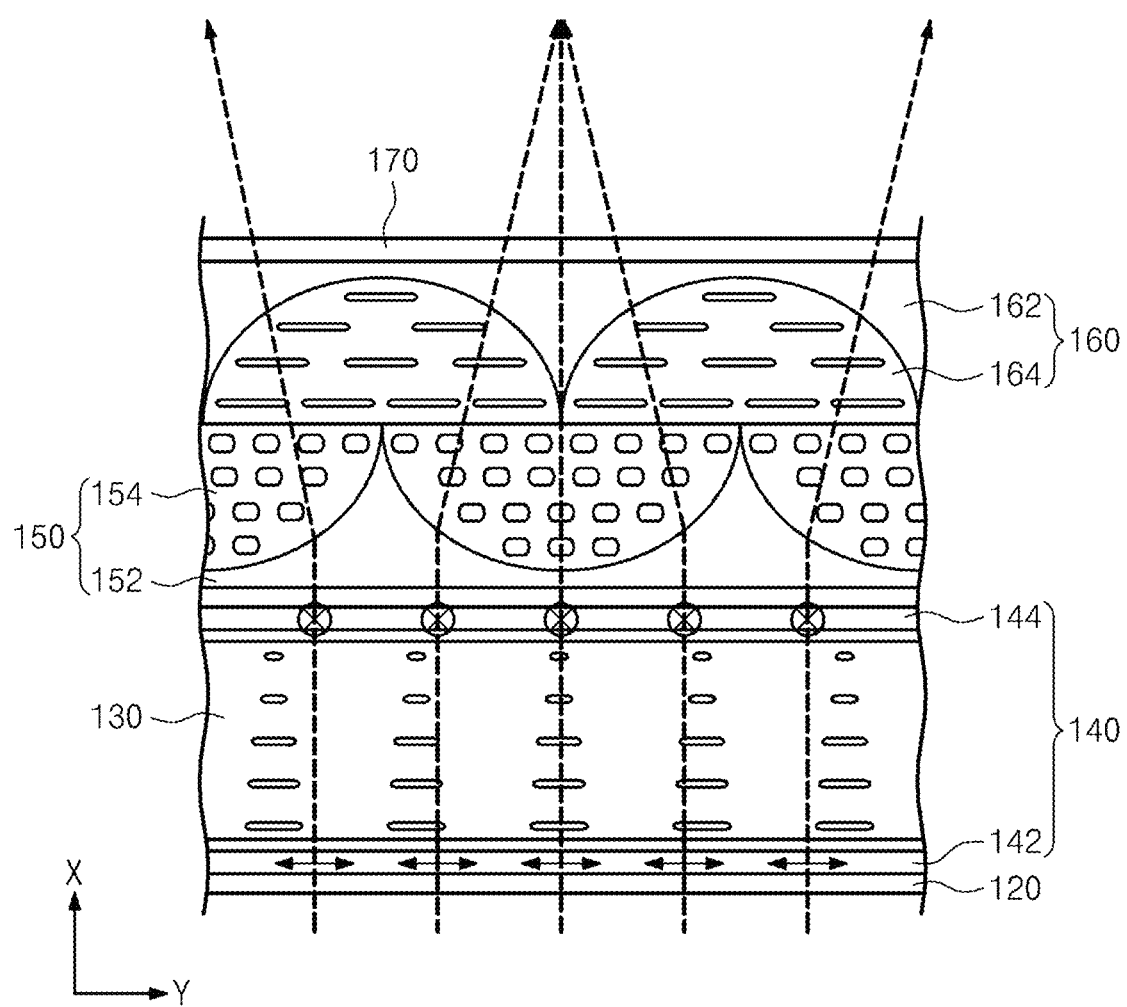
FIGS. 5 and 6 are cross-sectional views of a virtual-moving microlens array constituting a light field imaging system according to an embodiment of the inventive concept.
Figure 6:
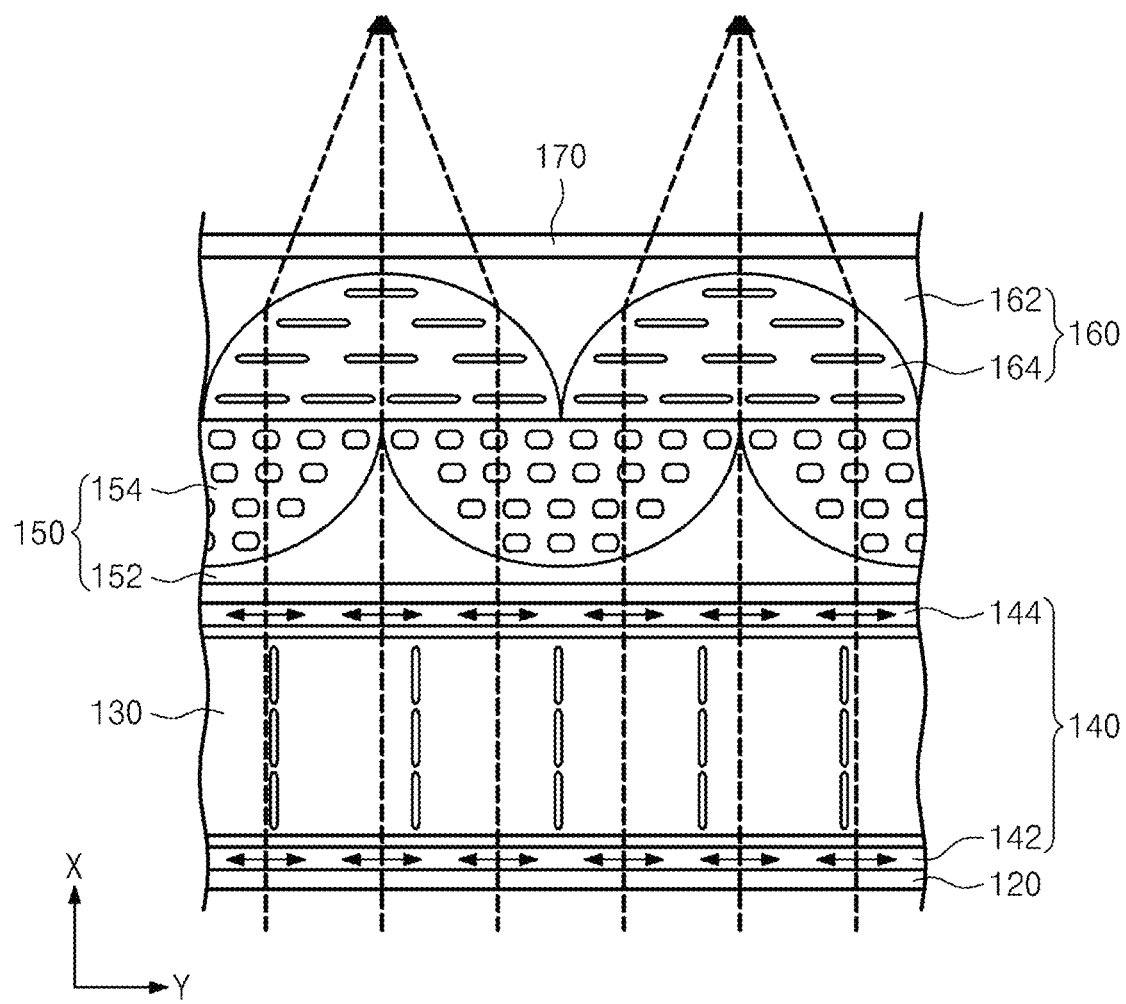

FIGS. 5 and 6 are cross-sectional views of a virtual-moving microlens array constituting a light field imaging system according to an embodiment of the inventive concept. FIGS. 3 and 5 are views showing that light transmitted through the first polarization dependent lens array 150 is imaged in the image sensor 180. FIGS. 4 and 6 are views showing that light transmitted through the second polarization dependent lens array 160 is imaged in the image sensor 180.

Referring to FIGS. 3 to 6, the polarizer 120 is disposed at the rear of the lens 110 with respect to the first direction X, which is a light propagation direction. The polarizer 120 polarizes the light collected by the lens 110. Non-polarized light reflected by the object 10 and incident passes through the polarizer 120 and is converted into linearly polarized light. For convenience of explanation, the propagation direction of the light (e.g., axial direction of the lens) is referred to as the first direction X, the polarization direction of the polarizer 120 is referred to as a second direction Y, and a direction perpendicular to both the first direction X and the second direction Y is referred to as the third direction Z.

The polarization switching unit 130 is disposed at the rear of the lens 110 with respect to the first direction X. The polarization switching unit 130 may include a liquid crystal layer and a polarization control unit 140 that electrically controls (switches) the liquid crystal array direction (orientation) of the liquid crystal layer. In order to alternately operate the first polarization dependent lens array 150 and the second polarization dependent lens array 160 as a lens, the polarization control unit 140 periodically changes the direction of the liquid crystal array of the liquid crystal layer by switching an electric field applied to the liquid crystal layer.

In order to apply a voltage to the liquid crystal layer of the polarization switching unit 130, the polarization control unit 140 may include first and second electrodes 142 and 144 provided on both sides of the polarization switching unit 130, and a voltage applying unit (not shown) that applies a voltage between the first electrode 142 and the second electrode 144. The first electrode 142 and the second electrode 144 may be provided as a transparent electrode such as a conductive indium tin oxide (ITO) substrate.

The first polarization dependent lens array 150 is disposed at the rear of the polarization switching unit 130 on the basis of the first direction X which is the propagation direction of light. The first polarization dependent lens array 150 operates as a lens to form light in the image sensor 180 selectively according to the electric field on/off state of the polarization switching unit 130 and the liquid crystal array direction of the liquid crystal layer according thereto.

The first polarization dependent lens array 150 may be provided as a structure in which the convex lens array 154 is disposed on the planar isotropic polymer layer 152. The convex lens array 154 may be provided as a liquid crystal phase polymer layer. The lens array 154 may be arranged at regular intervals along the second direction Y and the third direction Z. The lens array 154 may be formed to be convex in a direction of viewing the polarization switching unit 130.

The second polarization dependent lens array 160 is disposed at the rear of the first polarization dependent lens array 150 on the basis of the first direction X which is the propagation direction of light. The second polarization dependent lens array 160 may be provided as a structure in which the convex lens array 164 is disposed on the planar isotropic polymer layer 162. The lens array 164 may be arranged at regular intervals along the second direction Y and the third direction Z. The lens array 164 may be formed to be convex in a direction of viewing the image sensor 180.

The second polarization dependent lens array 160 is disposed in a staggered arrangement with respecto to the first polarization dependent lens array 150. The second polarization dependent lens array 160 may be disposed intersecting the first polarization dependent lens array 150 by half a period of the lens arrays 154 and 164. The second polarization dependent lens array 160 selectively serves as a lens for imaging with the image sensor 180 depending on the on/off state of the polarization switching unit 130 and the liquid crystal alignment according thereto.

The first polarization dependent lens array 150 and the second polarization dependent lens array 160 may be stacked between the second electrode 154 and the transparent film substrate 170. In order to minimize the difference between focal-plane and image-plane positions of two stacked polarization dependent lens arrays 150 and 160, the two polarization dependent lens arrays 150 and 160 may be disposed to contact the surfaces of the liquid crystal phase polymer layers of the lens arrays 154 and 164.

The liquid crystal alignment axis of the lens array 154 of the first polarization dependent lens array 150 and the lens array 164 of the second polarization dependent lens array 160 may be provided in directions perpendicular to each other. In the shown example, in the lens array 154, the liquid crystal is arranged in the third direction Z, and in the lens array 164, the liquid crystal is arranged in the second direction Y.

The liquid crystal alignment axis of the lens array 154 of the first polarization dependent lens array 150 may be the same as the polarization direction of the polarizer 120, and the liquid crystal alignment axis of the lens array 164 of the second polarization dependent lens array 160 may be perpendicular to the polarization direction of the polarizer 120. The liquid crystal alignment axes of the first polarization dependent lens array 150 and the second polarization dependent lens array 160 may be provided in reverse.

The polarization control unit 140 switches the polarization switching unit 130 between on and off states to alternately operate the first polarization dependent lens array 150 and the second polarization dependent lens array 160 as a lens. The polarization control unit 140 controls the orientation of the liquid crystal cell of the polarization switching unit 130, so that it controls the polarization direction of light to be 0° or 90° on the basis of the second direction Y, which is the polarization direction of the polarizer 120.

According to the liquid crystal array direction of the electrically controlled polarization switching unit 130, only one of the intersecting first and second polarization dependent lens arrays 150 and 160 having a staggered arrangement serves as a lens, such that the effect that the lens array is virtually moved by a half period every polarization switching period is provided.

According to the polarization direction of the incident light, one of the first and second polarization dependent lens arrays 150 and 160 is turned on, and the other is turned off. The rod-shaped liquid crystal phase polymer materials of the lens arrays 154 and 164 have birefringence characteristics having an extra-ordinary refractive index (long axial refractive index) and an ordinary refractive index (uniaxial refractive index). The ordinary refractive index of the liquid crystal phase polymer material of the lens arrays 154 and 164 is matched to the refractive index of the isotropic phase polymer of the isotropic polymer layers 152 and 162.

When the polarization direction of the light incident on the first and second polarization dependent lens arrays 150 and 160 coincides with the minor axis direction of the oriented liquid crystal phase polymer, the refractive index (e.g., ordinary refractive index) of the liquid crystal phase polymer layer of the lens array coincides with the refractive index of the isotropic phase polymer layer, so that the lens function of the corresponding polarization dependent lens array disappears. On the other hand, when the polarization direction of the light incident on the first and second polarization dependent lens arrays 150 and 160 coincides with the major axis direction of the oriented liquid crystal phase polymer, the refractive index (e.g., extra-ordinary refractive index) of the liquid crystal phase polymer layer is larger than that of the isotropic phase polymer layer, and the corresponding polarization dependent lens array operates as a lens.

Referring to FIG. 5, in the field-off state of the polarization switching unit 130, light polarized by the polarizer 120 in the second direction Y is converted by 90° on the basis of the first direction X, and is incident to the first polarization dependent lens array 150. In this case, the first polarization dependent lens array 150 operates as a lens due to a mismatch in refractive index between the liquid crystal phase polymer layer and the isotropic phase polymer layer, and due to a match in refractive index between the liquid crystal phase polymer layer and the isotropic phase polymer layer, the light proceeds without refraction in the second polarization dependent lens array 160.

Referring to FIG. 6, in the field-on state of the polarization switching unit 130, light polarized by the polarizer 120 in the second direction Y is incident on the first polarization dependent lens array 150 as it is without changing the polarization direction. At this time, in contrast to the case of FIG. 5, in the first polarization dependent lens array 150, due to a match in refractive index between the liquid crystal phase polymer layer and the isotropic phase polymer layer, light proceeds without refraction. The second polarization dependent lens array 160 operates as a lens due to a mismatch in refractive index between the liquid crystal phase polymer layer and the isotropic phase polymer layer.

In such a way, depending on the on/off state of the electrically controlled polarization switching unit 130, only one of the intersecting first and second polarization dependent lens arrays 150 and 160 operates as a lens, so that the lens array may be virtually moved by the half period of the microlenses. The polarization switching unit illustrated in FIGS. 5 and 6 is a twisted nematic (TN) mode liquid crystal (LC) element, but an LC element having a mode other than the TN mode may be used.

The image sensor 180 is disposed at the rear of the second polarization dependent lens array 160 on the basis of the first direction X, which is a propagation direction of light. The image sensor 180 may be provided as, for example, a charge coupled device (CCD) array. The image sensor 180 decomposes the light from the first and second polarization dependent lens arrays 150 and 160 for each direction, and records the decomposed light intensity information for each direction. The image sensor 180 obtains a first image from the light received in the on-state of the polarization switching unit 130, and obtains a second image from the light received in the off-state of the polarization switching unit 130.

Figure 7:
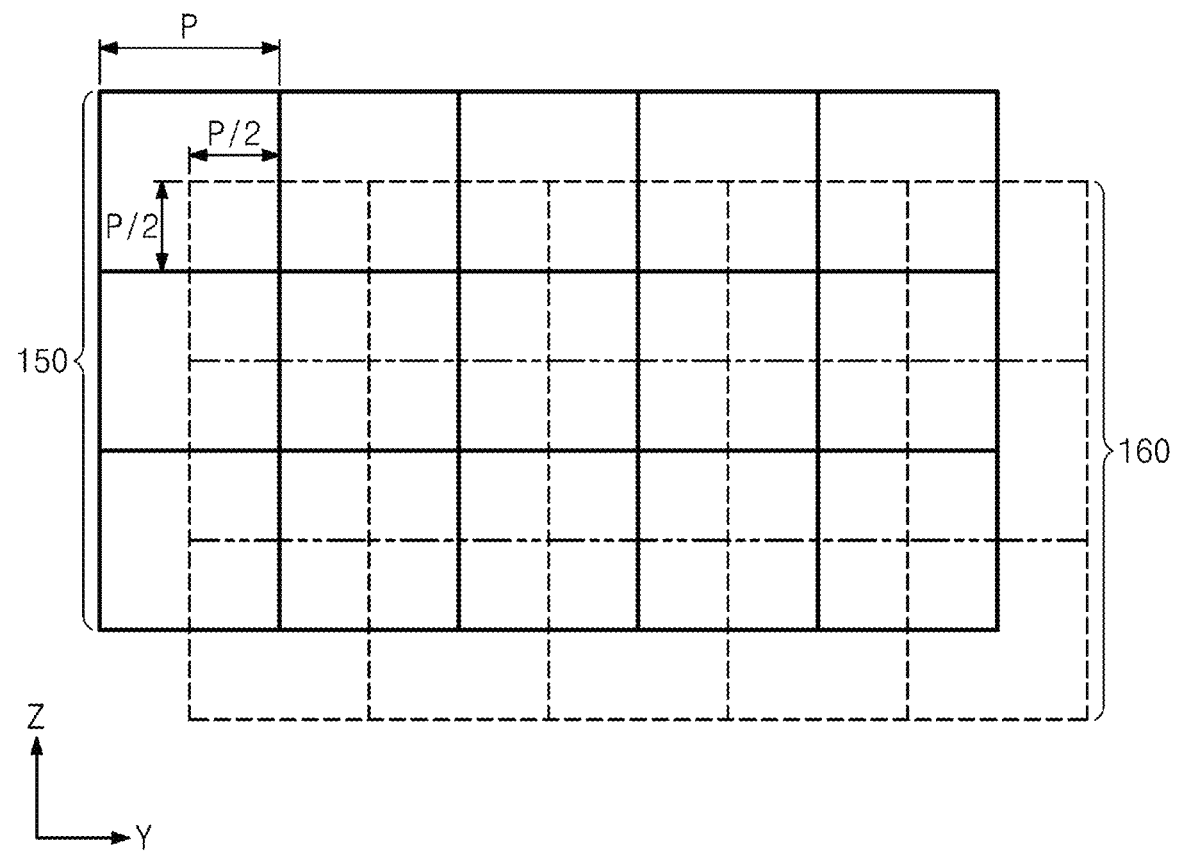
FIG. 7 is a conceptual diagram showing a planar arrangement of first and second polarization dependent lens arrays constituting a light field imaging system according to an embodiment of the inventive concept.

FIG. 7 is a conceptual diagram showing a planar arrangement of first and second polarization dependent lens arrays constituting a light field imaging system according to an embodiment of the inventive concept. The first and second polarization dependent lens arrays 150 and 160 have the same period p and are spaced apart by a half period (p/2) in the horizontal and vertical directions. The lens array periods p of the first and second polarization dependent lens arrays 150 and 160 may be several to several hundred μm, but are not limited thereto.

Figure 8:
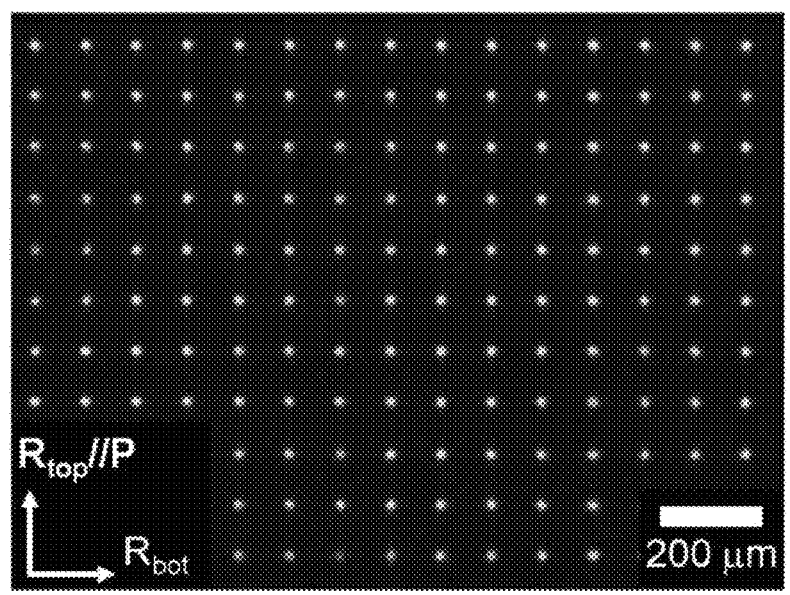
FIGS. 8 to 10 are exemplary views of light collected images according to the polarization direction of incident light of a light field imaging system according to an embodiment of the inventive concept.
Figure 9:
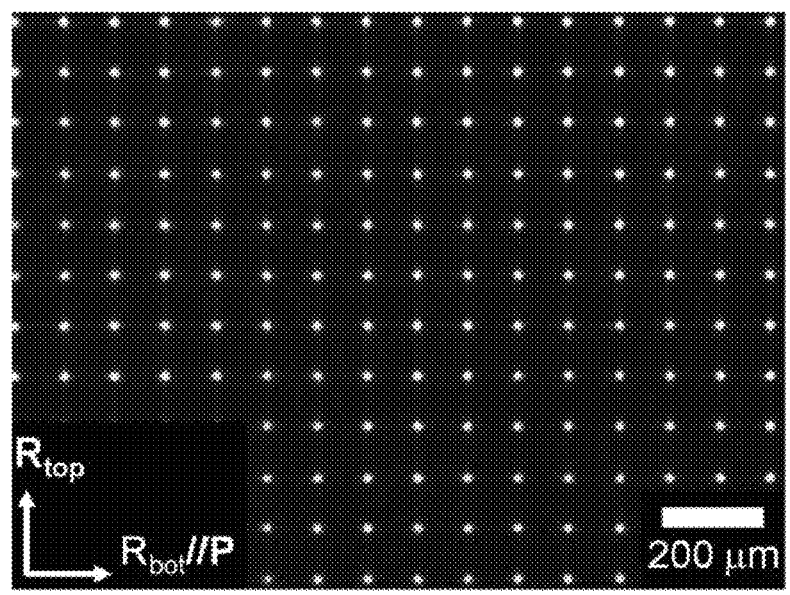
Figure 10:
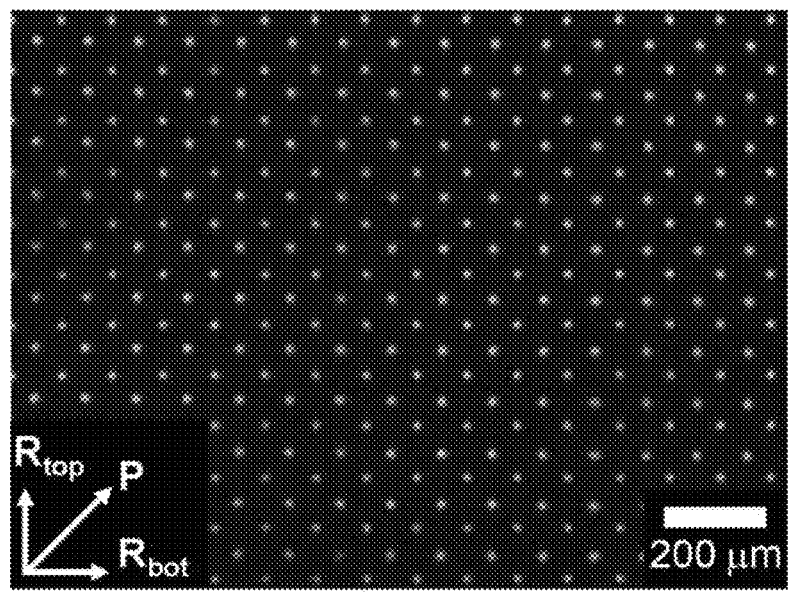

FIGS. 8 to 10 are exemplary views of light collected images according to the polarization direction of incident light of a light field imaging system according to an embodiment of the inventive concept. FIG. 8 is an image in which light polarized in a vertical direction is incident and collected by the first polarization dependent lens array 150. FIG. 9 is an image in which light polarized in a horizontal direction is incident and collected by the second polarization dependent lens array 160.

FIG. 10 is a case where light polarized in the 45° direction is incident. In the case of 45° polarization, the vertical polarization component and the horizontal polarization component are present in a ratio of 1:1. Accordingly, the vertical polarization component is collected by the first polarization dependent lens array 150, and the horizontal polarization component is collected by the second polarization dependent lens array 160. That is, the beam patterns collected by both the first and second polarization dependent lens arrays 150 and 160 are observed.

Figure 11:
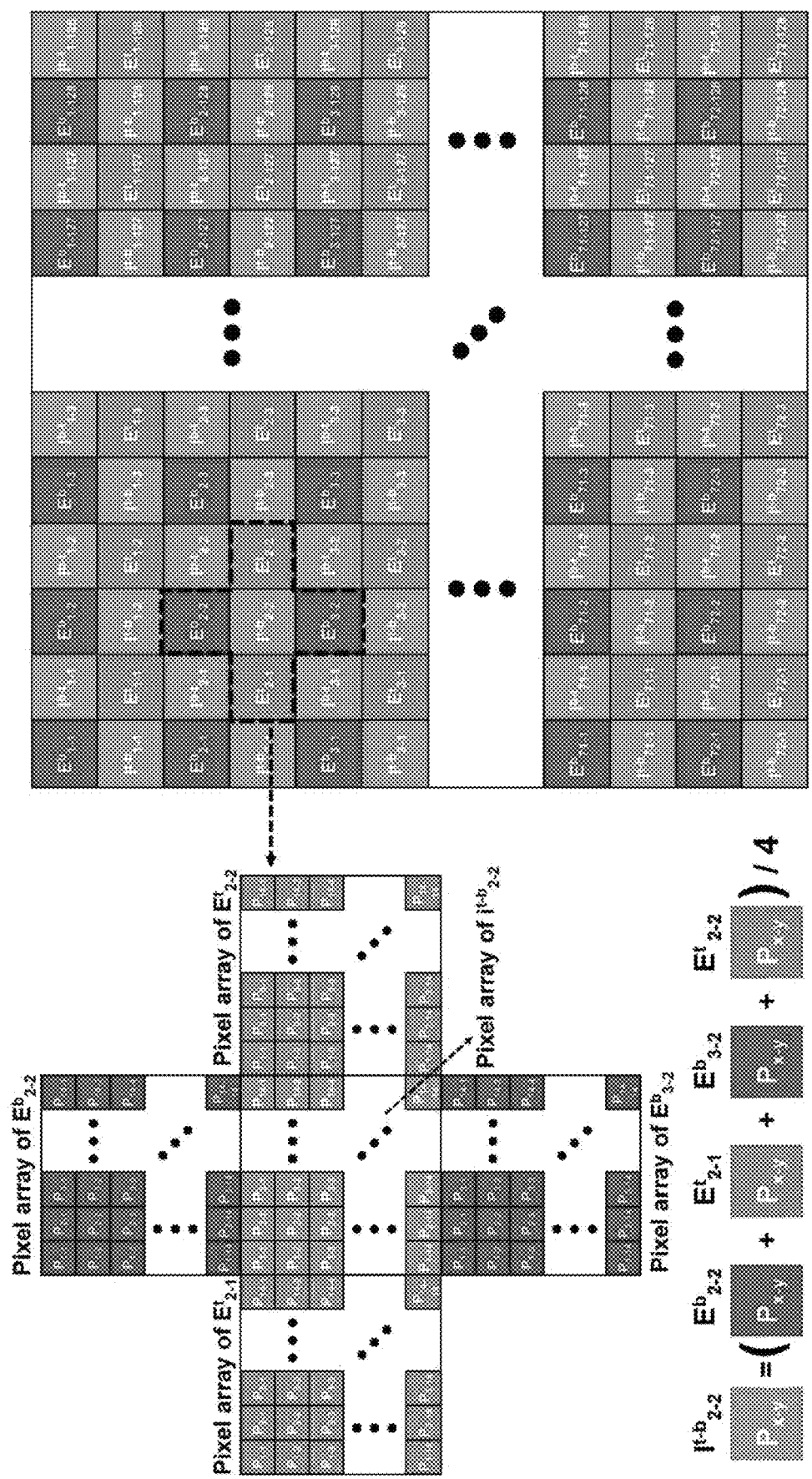
FIG. 11 is a conceptual diagram showing a method of combining images by a light field imaging system according to an embodiment of the inventive concept.

FIG. 11 is a conceptual diagram showing a method of combining images by a light field imaging system according to an embodiment of the inventive concept. Referring to FIGS. 1 and 11, according to the voltage on/off state of the polarization switching unit 130, the polarized light is converted into orthogonal polarization states and imaged by the image sensor 180. The image processing unit 190 generates a high resolution image by combining images (e.g., first image and second image) obtained from light in different polarization directions.

The image processing unit 190 combines a first image refracted by the first polarization dependent lens array 150 and imaged by the image sensor 180 and a second image refracted by the second polarization dependent lens array 160 and imaged by the image sensor 180 to generate a high resolution image having twice the resolution (four times in two dimensions) of the first image and the second image. The image processing unit 190 may generate a high resolution image by interpolating corresponding pixels of the first image and the second image.

In the example shown in FIG. 11, the number of horizontal and vertical microlenses of the polarization dependent lens array is 128 and 72, respectively, and the number of CCD pixels covered by one microlens is 14×14. $E^b$ and $E^t$ represent a first image and a second image, respectively. $E^b_{2-1}$ is a 14×14 pixel image obtained by a two row×one column microlens of the first polarization dependent lens array 150.

The image processing unit 190 spaces the adjacent first pixels of the first image $E^b$ by a unit pixel, and spaces the adjacent second pixels of the second image $E^t$ by the unit pixel, and then, moves them in the diagonal direction by the unit pixel and arranges them in a grid form to intersect the first pixels of the first image $E^b$.

Thereafter, the image processing unit 190 interpolates each of the image pixels $I^{t-b}$ between the first pixels of the first image $E^b$ and between the second pixels $E^t$ of the second image $E^t$ with an average value $\{I^{t-b}_{2-2}=(E^b_{2-2}+E^b_{3-2}+E^t_{2-1}+E^t_{2-2})/4\}$ of the first pixels $E^b_{2-2}$ and $E^b_{3-2}$ and the second pixels $E^t_{2-1}$ and $E^t_{2-2}$ adjacent to the image pixel $I^{t-b}$. The image processing unit 190 arranges the image pixels calculated by interpolating the adjacent first pixels $E^b_{2-2}$ and $E^b_{3-2}$ and the second pixels $E^t_{2-1}$ and $E^t_{2-2}$ at unit pixel intervals to generate a high resolution image.

Figure 12:
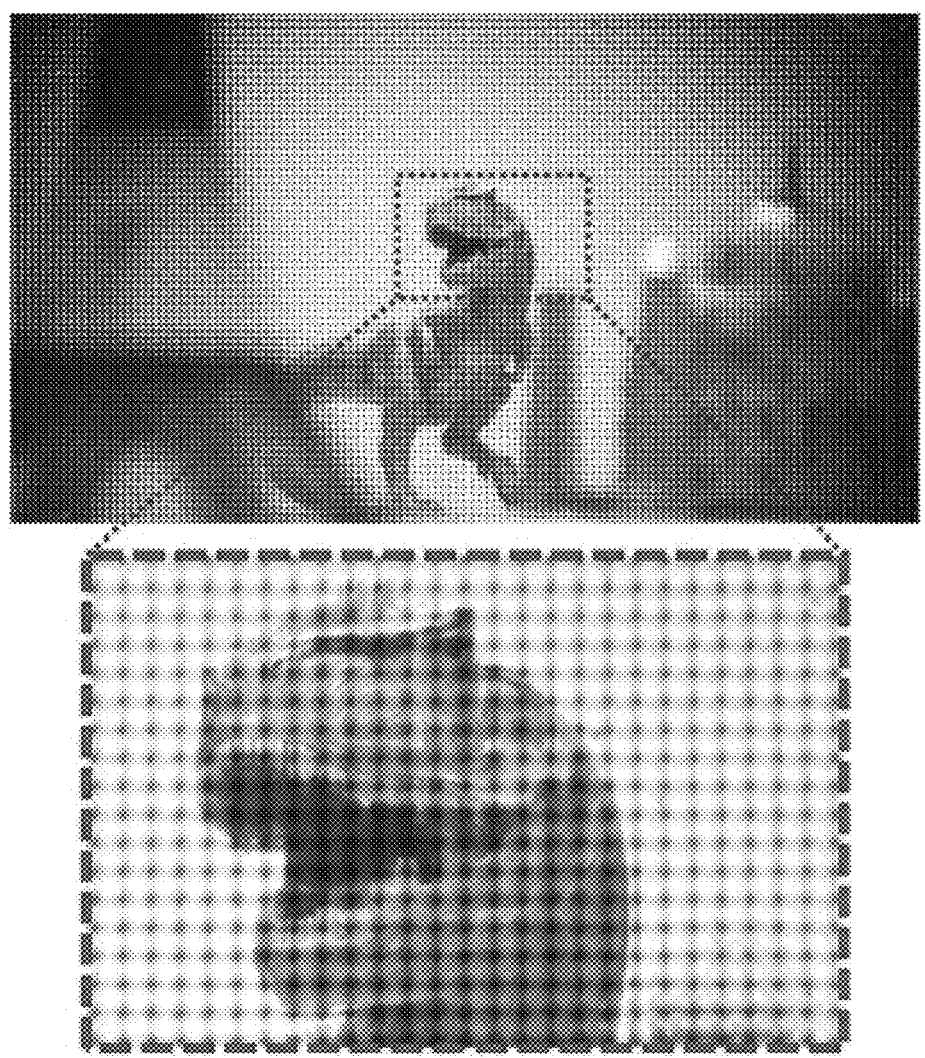
FIGS. 12 to 14 are exemplary views of images obtained according to the voltage on/off state of a polarization switching unit by a light field imaging system according to an embodiment of the inventive concept.
Figure 13:
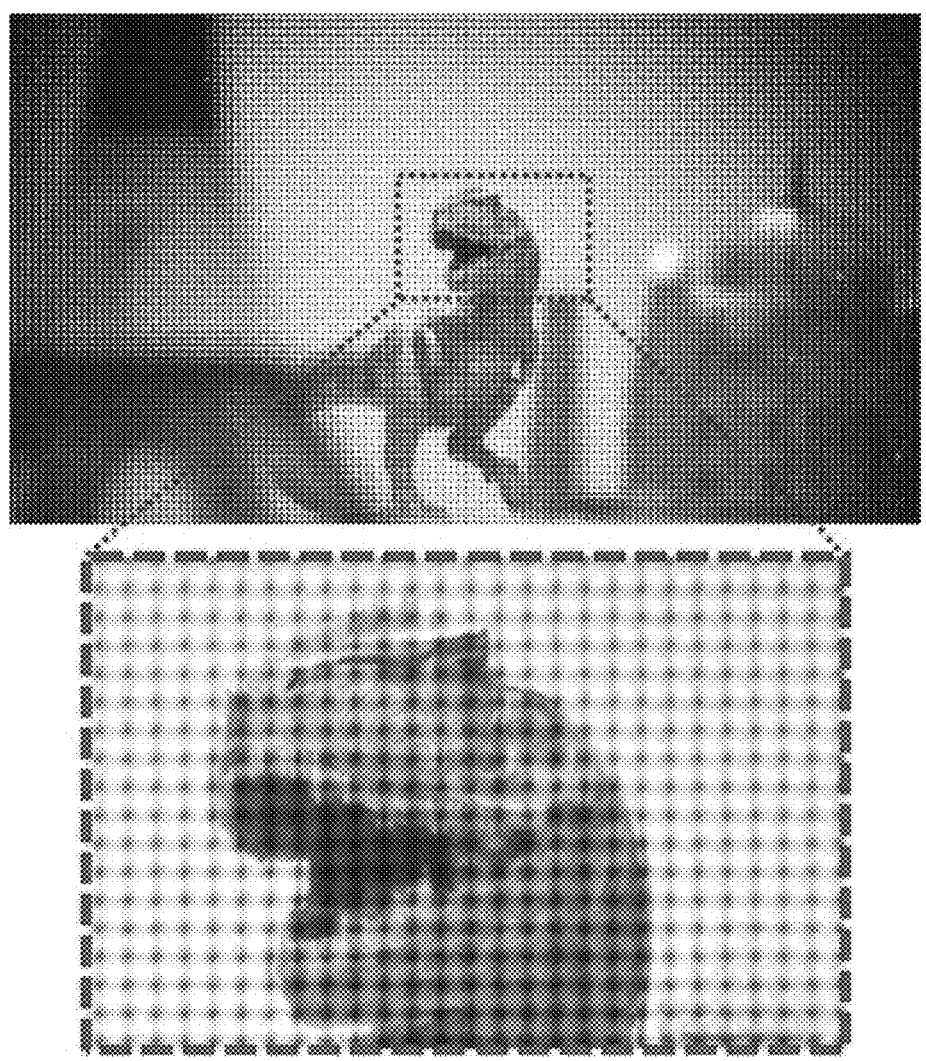
Figure 14:
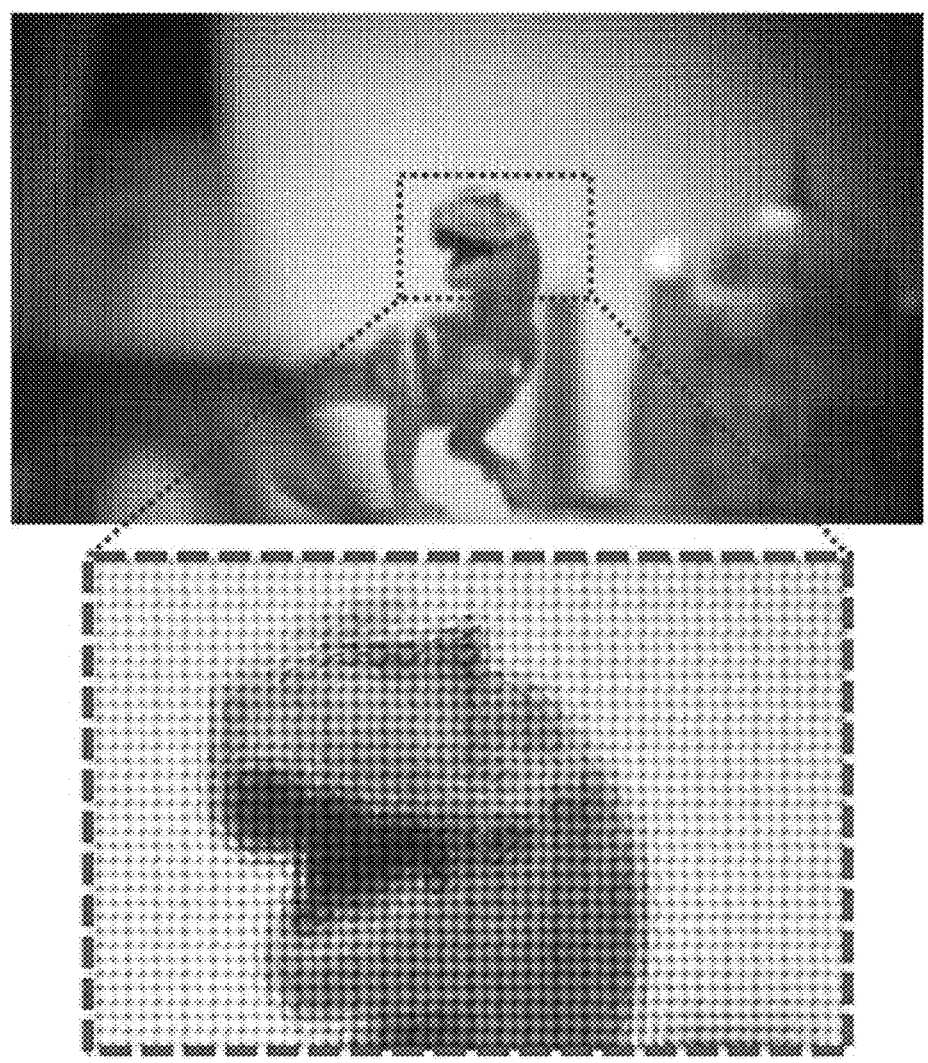

FIGS. 12 to 14 are exemplary views of images obtained according to the voltage on/off state of a polarization switching unit by a light field imaging system according to an embodiment of the inventive concept. FIG. 12 is an image obtained by the first polarization dependent lens array 150 and the image sensor 180 in the off-state of the polarization switching unit 130. FIG. 13 is an image obtained by the second polarization dependent lens array 160 and the image sensor 180 in the on-state of the polarization switching unit 130. The resolution of each image is 14×14×128×72.

FIG. 14 is an image obtained by combining the images of FIGS. 12 and 13. The resolution of the combined image is 14×14×(128×2)×(72×2). As described above, the polarization switching unit 130, the polarization control unit 140, and the first and second polarization dependent lens arrays 150 and 160 serve as electrically switchable virtual-moving microlens arrays. After each imaging in a state before and after virtual movement of the virtual-moving microlens array, through a process of combining and recovering each image, without reducing the number of directions and angular resolution of the directional-view image of the light field imaging system, the lateral resolution of the recovered image and resolution of the light field imaging system may be improved. Accordingly, the light field imaging system 100 may improve the resolution of the image obtained by the image sensor 180 and the image processing unit 190 two times in one dimension and four times in two dimensions without reducing angular resolution.

Figure 15:
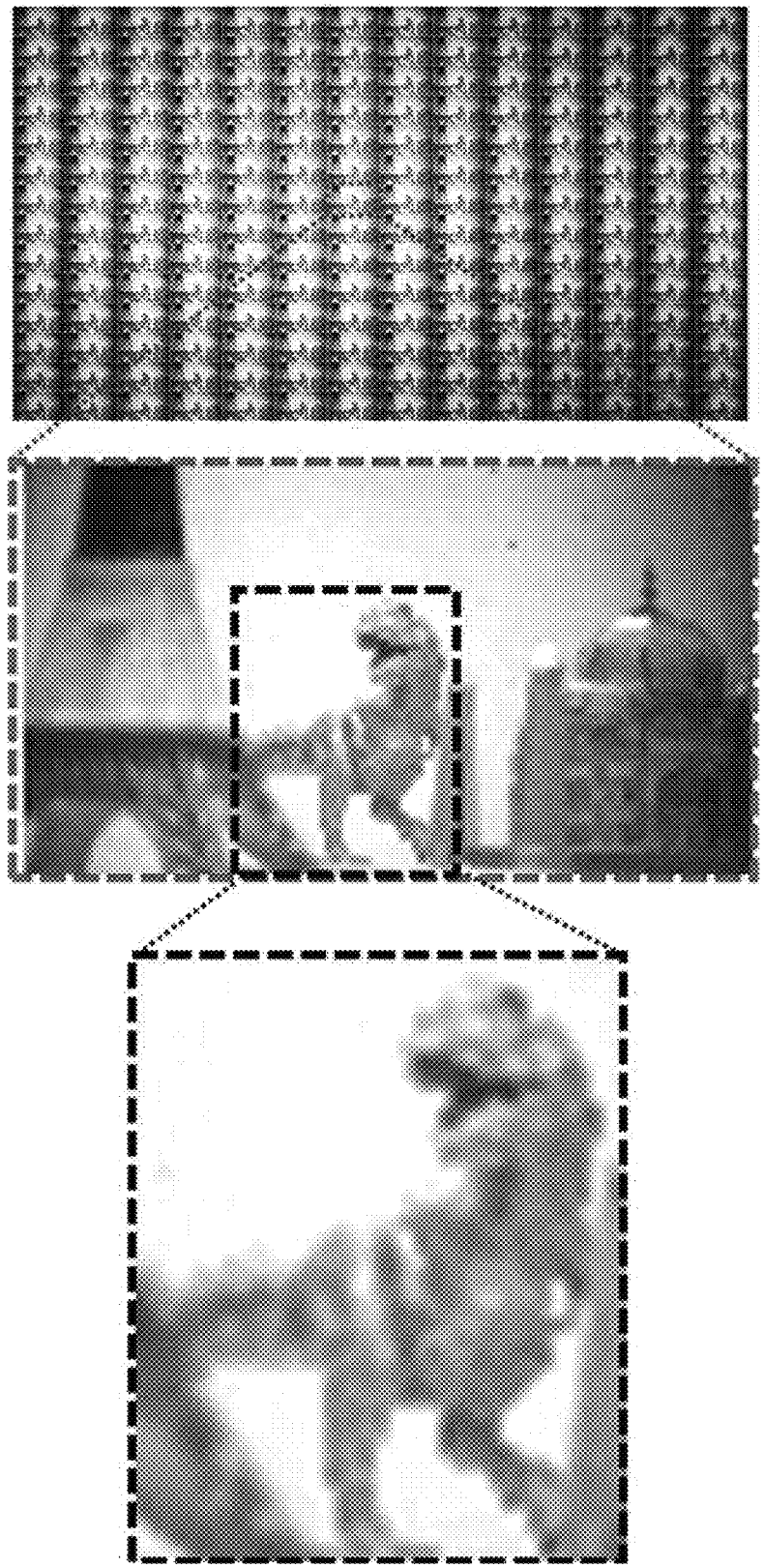
FIG. 15 is a directional-view image recovered by a conventional light field imaging system based on an image acquired by one microlens array.
Figure 16:
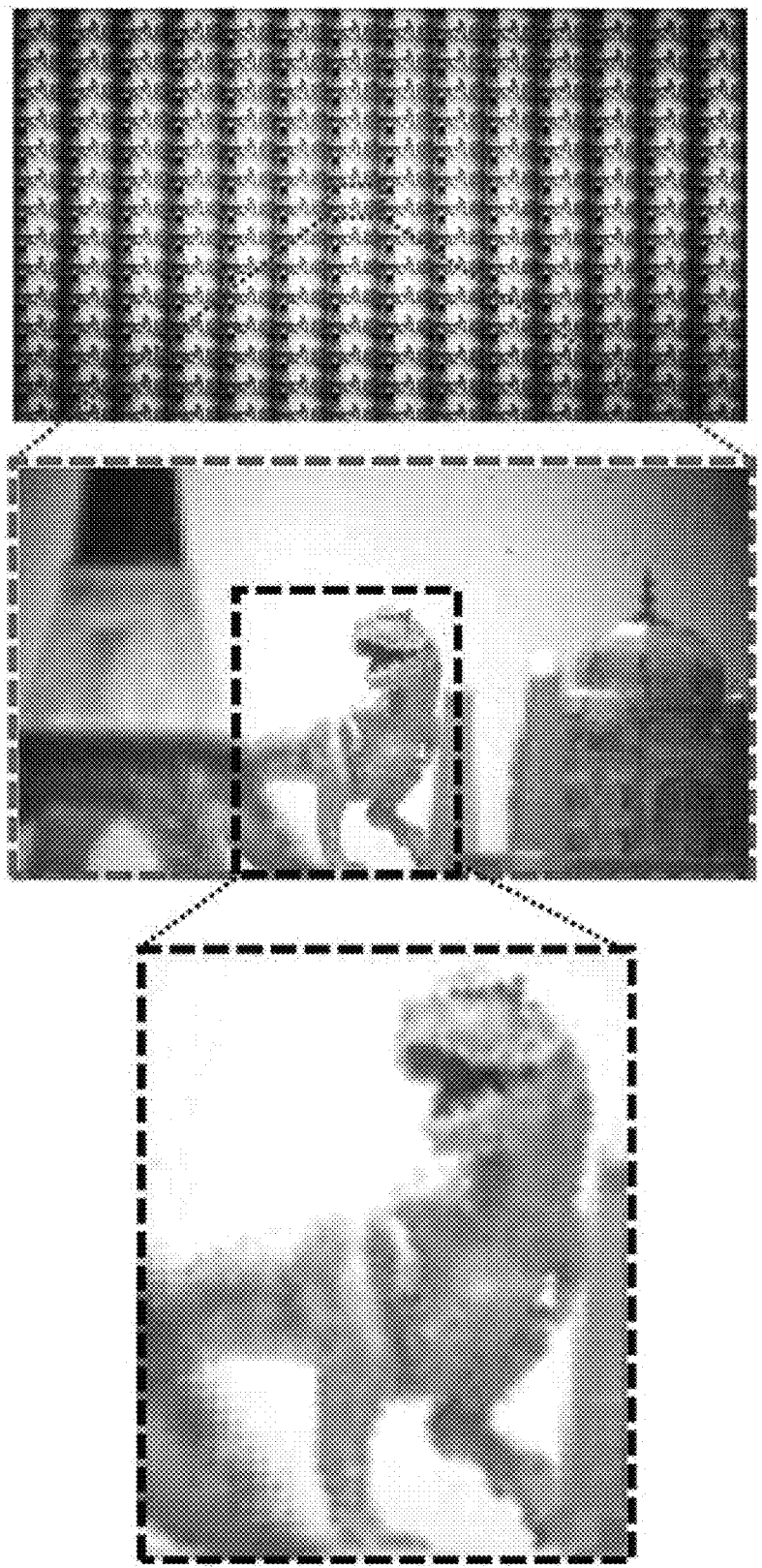
FIG. 16 is a directional-view image recovered based on an image obtained by a light field imaging system according to an embodiment of the inventive concept.

FIG. 15 is a directional-view image recovered by a conventional light field imaging system based on an image obtained by one microlens array. FIG. 16 is a directional-view image recovered based on an image obtained by a light field imaging system according to an embodiment of the inventive concept. The enlarged image is the 7-7th directional-view image. Through the enlarged image, it may be seen that the directional-view image recovered through the image obtained by the light field imaging system to which the virtual-moving microlens array is applied may have a higher resolution image. The resolution of the directional-view image of FIG. 15 is 128×72 and the resolution of the directional-view image of FIG. 16 is (128×2)×(72×2).

Figure 17:
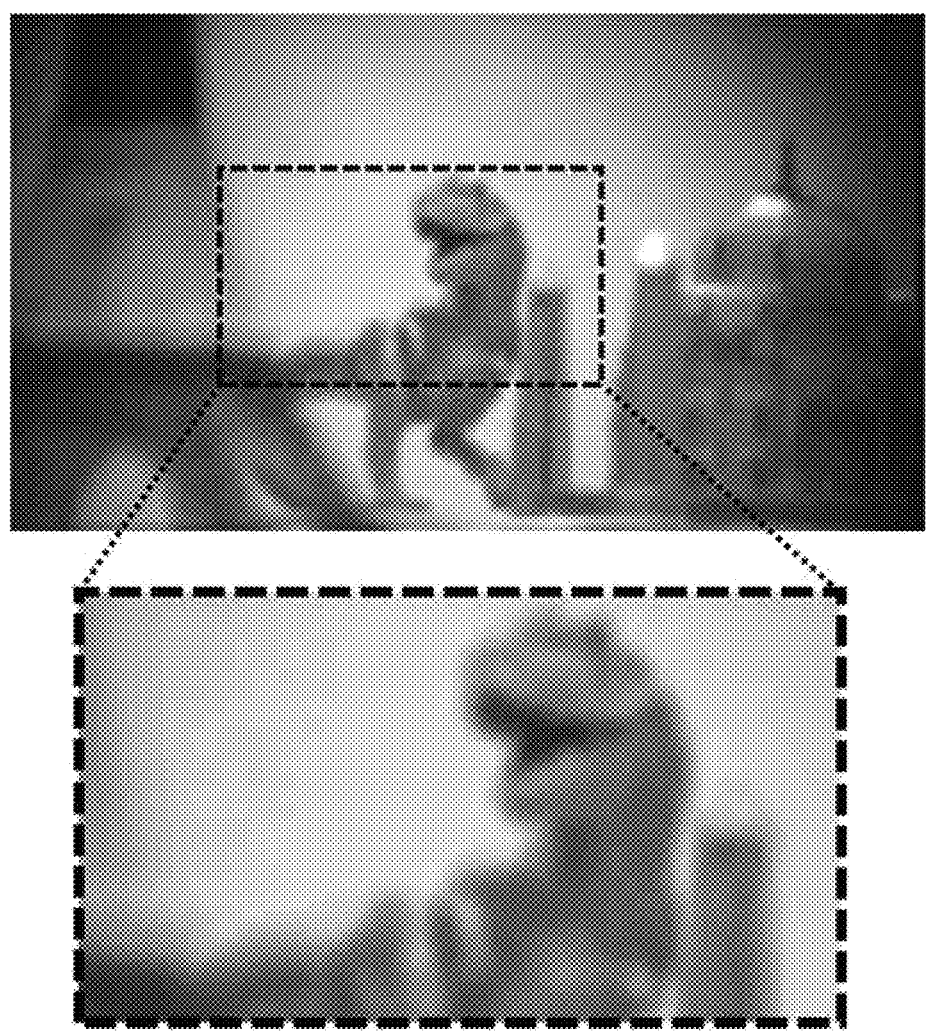
FIGS. 17 to 19 are exemplary views of focusing images recovered by a conventional light field imaging system based on an image obtained by one microlens array.
Figure 18:
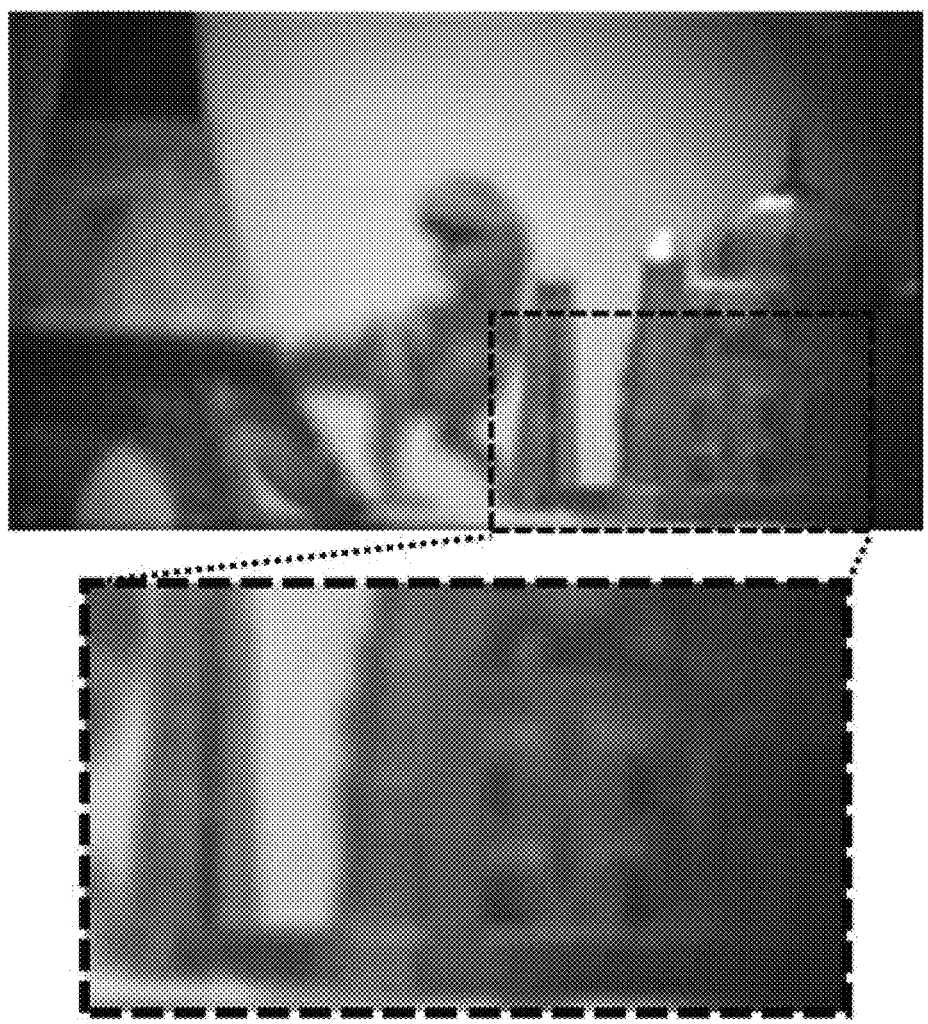
Figure 19:
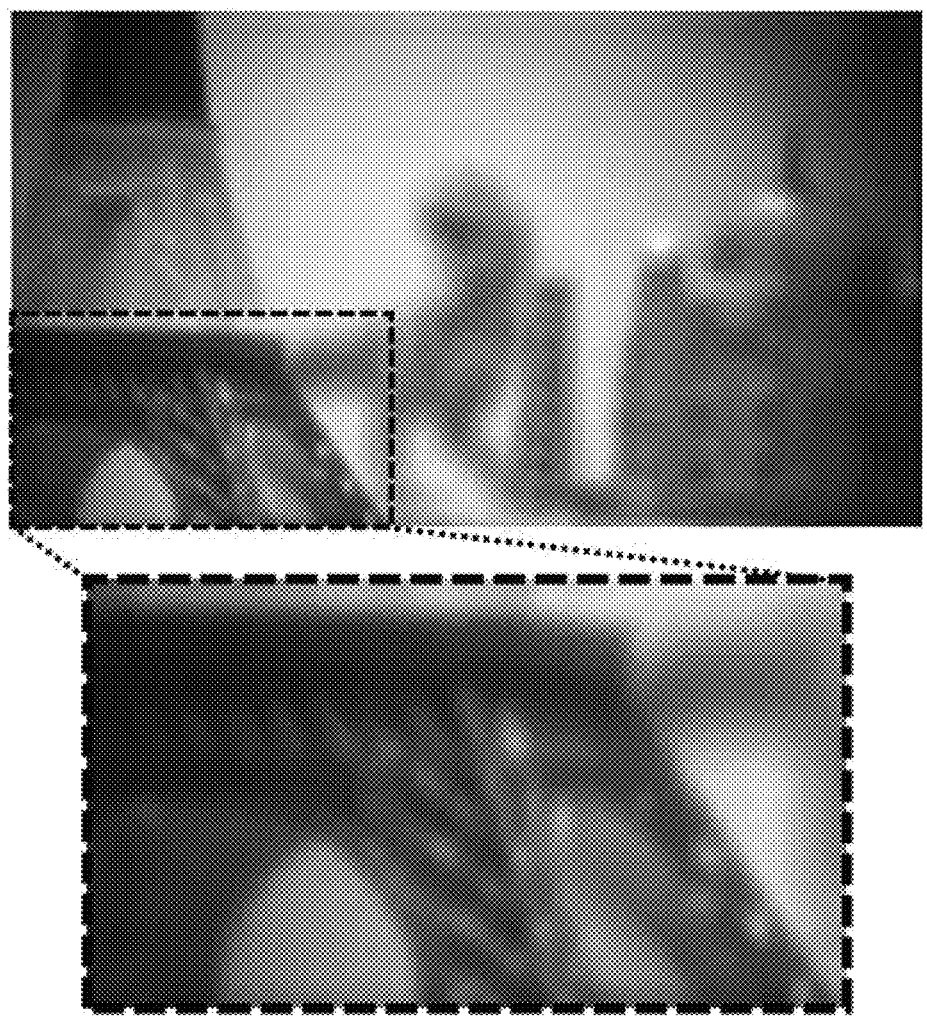
Figure 20:
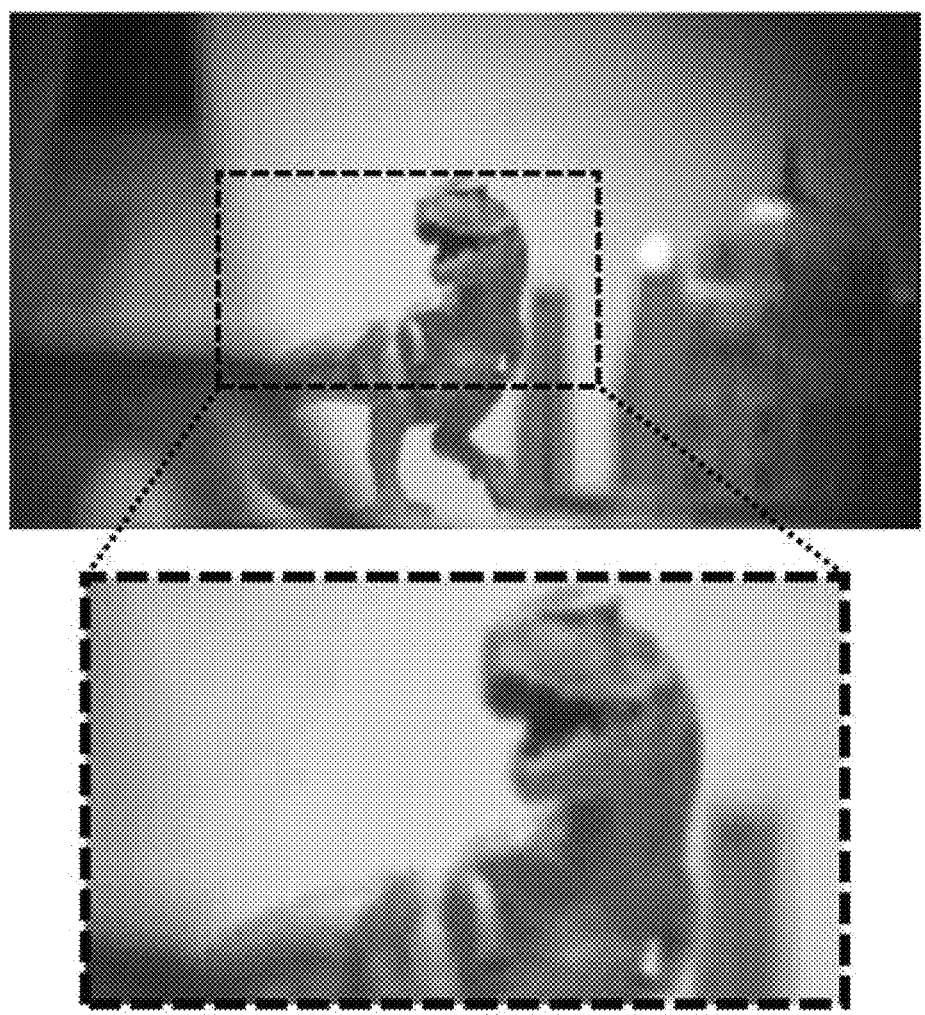
FIGS. 20 to 22 are exemplary views of focusing images recovered based on an image obtained by a light field imaging system according to an embodiment of the inventive concept.
Figure 21:
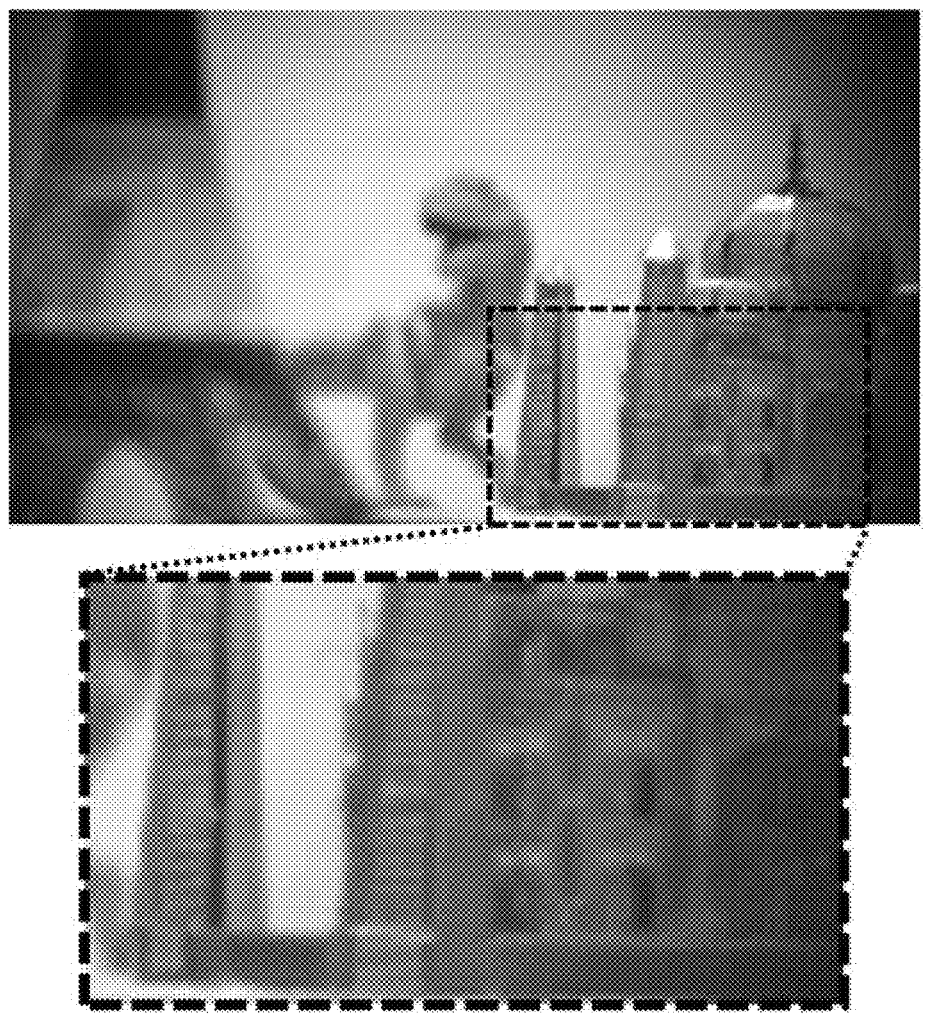
Figure 22:
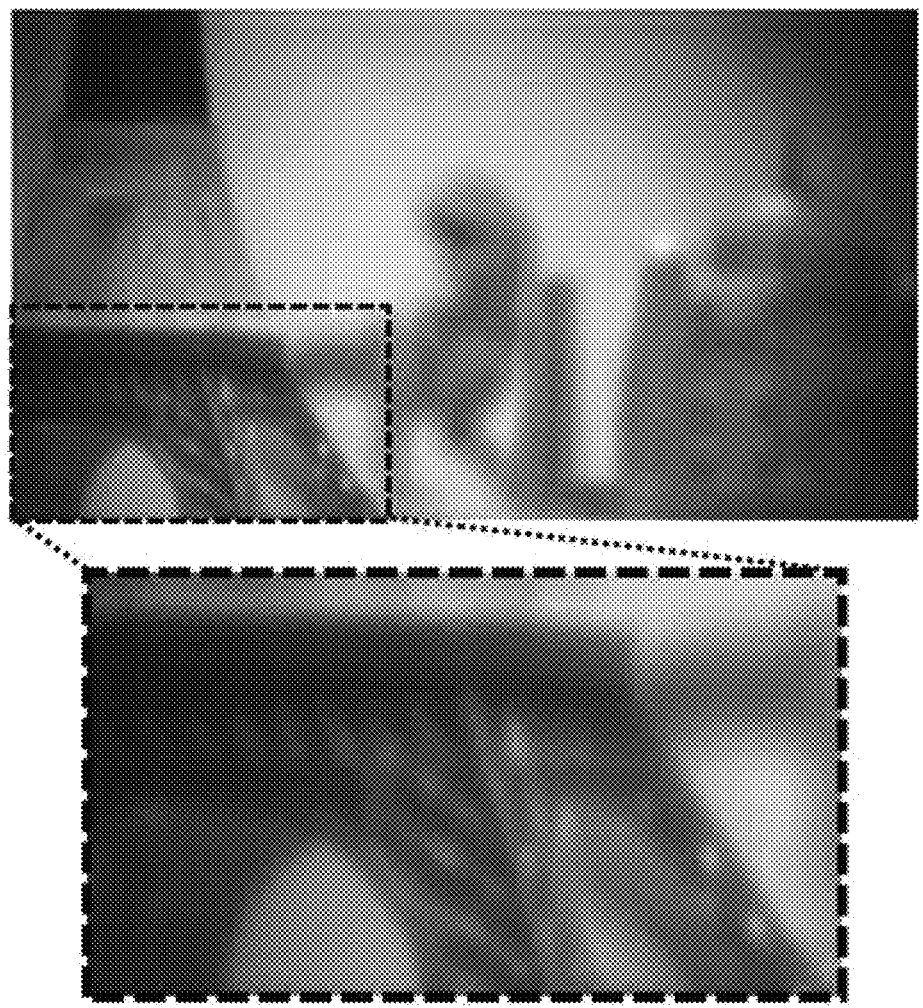

FIGS. 17 to 19 are exemplary views of focusing images recovered by a conventional light field imaging system based on an image obtained by one microlens array. FIGS. 20 to 22 are exemplary views of focusing images recovered based on an image obtained by a light field imaging system according to an embodiment of the inventive concept. FIGS. 17 and 20 are short distance focusing images. FIGS. 18 and 21 are intermediate distance focusing images. FIGS. 19 and 22 are long distance focusing images. Through the enlarged image, it may be seen that the focusing image recovered through the image obtained by the light field imaging system to which the virtual-moving microlens array is applied according to an embodiment of the inventive concept has a higher resolution than the conventional one.

Figure 23:
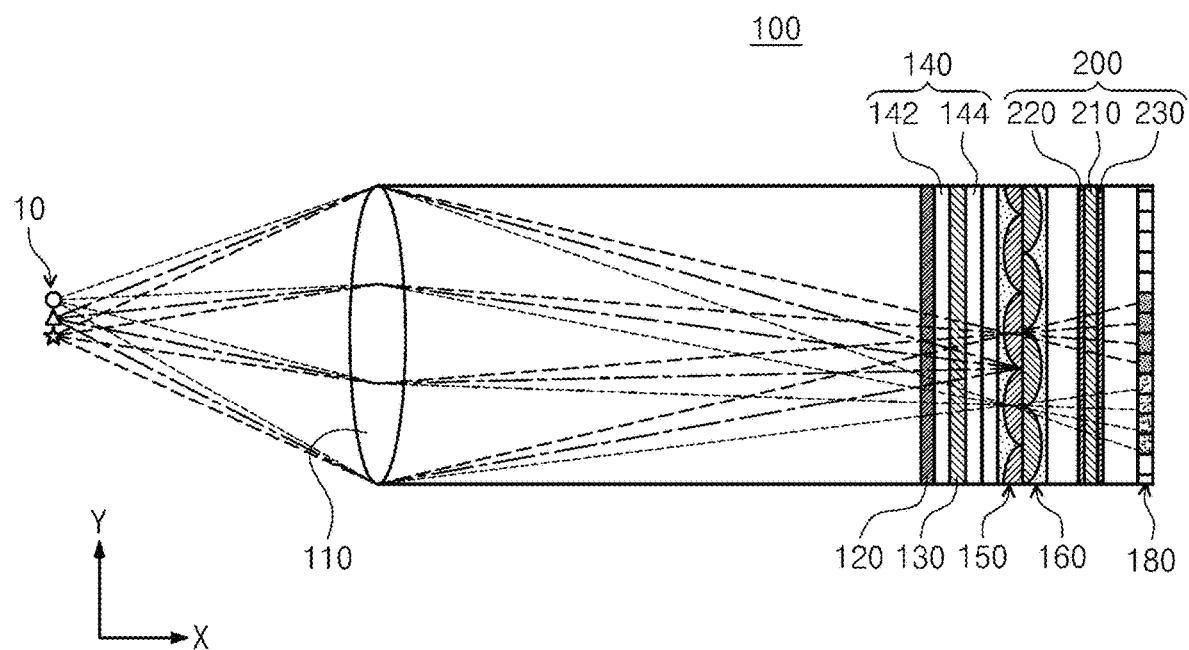
FIG. 23 is a view showing a light field imaging system according to another embodiment of the inventive concept.

FIG. 23 is a view showing a light field imaging system according to another embodiment of the inventive concept. In the description of the embodiment of FIG. 23, a description overlapping with the above-described embodiment will be omitted. The light field imaging system according to the embodiment of FIG. 23 further includes an optical path length control unit 200, which is different from the embodiment described above. The optical path length control unit 200 is disposed between the second polarization dependent lens array 160 and the image sensor 180.

The optical path length control unit 200 may be provided to be electrically drivable. The optical path length control unit 200 may control the optical path length to allow the focal-plane and image-plane positions of the first polarization dependent lens array 150 and the second polarization dependent lens array 160 to be matched. The optical path length control unit 200 may be driven only while the first polarization dependent lens array 150 operates as a lens, or may be driven only while the second polarization dependent lens array 160 operates as a lens.

In an embodiment, the optical path length control unit 200 includes a blue phase liquid crystal element 210, electrodes 220 and 230 for applying an electric field to the blue phase liquid crystal device 210, and a voltage supply unit (not shown) for applying a voltage between the electrodes 220 and 230. The optical path length control unit 200 may be driven at the same period as the change period of the polarization switching unit 130.

According to an embodiment of the inventive concept, there is provided a light field imaging system capable of increasing the lateral resolution of a recovered image without degrading the angular resolution.

The effects of the inventive concept are not limited to the effects described above. Effects that are not mentioned will be clearly understood by those skilled in the art from the present specification and the accompanying drawings.

Although the exemplary embodiments of the inventive concept have been described, it is understood that the inventive concept should not be limited to these exemplary embodiments but various changes and modifications may be made by one ordinary skilled in the art within the spirit and scope of the inventive concept as hereinafter claimed.

What is claimed is:

1. A light field imaging system comprising:
a lens configured to collect light transmitted from an object;
a polarizer disposed at the rear of the lens on the basis of a propagation direction of the light and configured to polarize the light collected by the lens;
a polarization switching unit disposed at the rear of the polarizer on the basis of the propagation direction of the light and configured to repeatedly switch the polarization direction of the light in a first polarization direction and a second polarization direction;
a first polarization dependent lens array disposed at the rear of the polarization switching unit on the basis of the propagation direction of the light and configured to operate as a lens when the polarization direction of the light is the first polarization direction;
a second polarization dependent lens array disposed at the rear of the first polarization dependent lens array on the basis of the propagation direction of the light and configured to operate as a lens when the polarization direction of the light is the second polarization direction, the second polarization dependent lens array having a staggered arrangement with respect to the first polarization dependent lens array;
an image sensor disposed at the rear of the second polarization dependent lens array on the basis of the propagation direction of the light and configured to obtain a first image from the light collected by the first polarization dependent lens array and obtain a second image from the light collected by the second polarization dependent lens array; and
an image processing unit configured to combine the first image and the second image to generate a high resolution image having higher resolution than the first image and the second image.

2. The light field imaging system of claim 1, wherein the polarization switching unit comprises:
a liquid crystal layer; and
a polarization control unit configured to alternately operate the first polarization dependent lens array and the second polarization dependent lens array as a lens by switching an electric field applied to the liquid crystal layer to periodically change a liquid crystal array direction of the liquid crystal layer.

3. The light field imaging system of claim 1, wherein the first polarization dependent lens array comprises first microlenses arranged periodically, and the second polarization dependent lens array comprises second microlenses arranged periodically, the first microlenses and the second microlenses being aranged at the same period, and
wherein the first polarization dependent lens array is disposed in the staggered arrangement with respect to the second polarization dependent lens array by the half period of the first microlenses.

4. The light field imaging system of claim 1, further comprising an optical path length control unit disposed between the second polarization dependent lens array and the image sensor and configured to be driven electrically to control an optical path length of the light.

5. The light field imaging system of claim 4, wherein the optical path length control unit is configured to control the optical path length to allow focal-planes of the first polarization dependent lens array and the second polarization dependent lens array to be matched and image-plane positions of the first polarization dependent lens array and the second polarization dependent lens array to be matched.

6. The light field imaging system of claim 5, wherein the optical path length control unit is driven at the same period as the change period of the polarization switching unit.

7. The light field imaging system of claim 5, wherein the optical path length control unit is driven only while the first polarization dependent lens array operates as a lens, or is driven only while the second polarization dependent lens array operates as a lens.

8. The light field imaging system of claim 1, wherein the second polarization direction is a direction orthogonal to the first polarization direction.

9. The light field imaging system of claim 1, wherein the first polarization dependent lens array comprises a first liquid crystal lens array, and the second polarization dependent lens array comprises a second liquid crystal lens array,
wherein liquid crystal array directions of the first liquid crystal phase lens array and the second liquid crystal phase lens array are perpendicular to each other.

10. The light field imaging system of claim 9, wherein the liquid crystal array direction of the first liquid crystal lens array is perpendicular to the first polarization direction or the second polarization direction.

11. The light field imaging system of claim 1, wherein the image processing unit is configured to generate the high resolution image by interpolating corresponding pixels of the first image and the second image.

12. The light field imaging system of claim 11, wherein the image processing unit is configured to:
space adjacent first pixels of the first image by a unit pixel, space adjacent second pixels of the second image by the unit pixel, and diagonally move the second pixels by the unit pixel to arrange the second pixels in a grid form intersecting the first pixels; and
in an image in which the first pixels and the second pixels are arranged in the grid form, interpolate each of image pixels between the first pixels and between the second pixels with an average value of the first pixels and the second pixels adjacent to each image pixel to generate the high resolution image.

13. The light field imaging system of claim 12, wherein the image processing unit is configured to generate the high resolution image by arranging the image pixels calculated by interpolating the first pixels and the second pixels at an interval of the unit pixel.

* * * * *